United States Patent [19]

Snyder

[11] Patent Number: 5,096,772

[45] Date of Patent: Mar. 17, 1992

[54] ANISOTROPIC LAMINATE OF BELTED PORTIONS OF A SCRAP TIRE

[76] Inventor: Robert H. Snyder, 1367 Balfour Rd., Grosse Pointe Park, Mich. 48230

[21] Appl. No.: 511,578

[22] Filed: Apr. 20, 1990

[51] Int. Cl.$^5$ .............................................. B60C 9/00
[52] U.S. Cl. .................................. 428/295; 152/531; 152/535; 156/96; 156/126; 156/130; 428/105; 428/109; 428/250; 428/902
[58] Field of Search ............... 428/105, 109, 110, 250, 428/295, 902; 152/535, 531; 156/94, 95, 96, 126, 130

[56] References Cited

U.S. PATENT DOCUMENTS 4,688,615  8/1987  Lee ...................................... 428/110

Primary Examiner—James J. Bell
Attorney, Agent, or Firm—Alfred D. Lobo

[57] ABSTRACT

The problem of recycling scrap radial tires is addressed by providing many uses for a laminate made by bonding two or more belt sections of a radial tire, the sidewalls of which have been cut away, the tire then cut open, and de-treaded. The result is a multi-ply structure which is sensibly rigid in all three directions because each belt ply in a belt is reinforced with cords at an angle, the cord angle in one belt ply being opposed to the angle in the other. A slat, bar, or beam, formed with plural belts is essentially rigid in a direction at right angles to its longitudinal axis, because for bending to occur, one belt must be in tension and the other in compression. Neither condition is favored because of the opposed cord angles and belt geometry. Though essentially rigid because of the cord geometry, the amount of rubber in the laminate allows it to be deformable relative to wood or steel having the same thickness. The result is a laminate which has anisotropic properties but may also be used to absorb impact. Belts reinforced with steel wire cords are preferred. Various configurations, such as arcuate slats, bars or beams may be formed, as well as mats and annular bodies.

34 Claims, 9 Drawing Sheets

ANISOTROPIC LAMINATE OF BELTED PORTIONS OF A SCRAP TIRE

BACKGROUND OF THE INVENTION

Ever since automobiles became popular, disposal of their discarded pneumatic tires (referred to as "casings") has been a never-ending source of problems. The problems have been exacerbated by the exponential growth of the automobile industry and the commercial adoption of the steel-belted radial tire. The term "casing" is used hereinafter to refer specifically to a worn out tire. It will be appreciated that, except in those instances where a tire manufacturer must dispose of unused scrap tires, this invention will deal with radial ply casings. In particular, it will concern chiefly the steel-belted portion (for reasons which will be set forth hereunder) of the annular crown of the casing, after it has been cut open to form a flat strip, and the tread has been sliced off the crown. The cut is made along the longitudinal axis of the annular crown.

A steel-belted radial passenger tire is conventionally constructed with a pair of tread reinforcing rubber belts or plies, one placed radially inwardly of the other, the plies having cords with equal and opposite cord angles relative to the midcircumferential center plane of the tire. The cords in each belt are in parallel spaced apart relationship. When bonded together by vulcanization in a curing press, the two plies form a laminate which reinforces the tread, the mechanical properties of the cured laminate being greatly different from those of the uncured belts, because of the constraint dictated by the cord geometries and interply bonding. The cords in the reinforcing belt are desirably made of a high modulus relatively inextensible material, such as steel, glass, aramid or rayon. At present, steel belts are preponderantly used, and it is to steel-belted radial tires to which this invention is chiefly directed, though it will be evident that belts of other essentially inextensible reinforcing cords may also be used.

Once the tire is cured, the cured laminate of two plies behaves as a unitary article encasing the carcass ply or plies, and since this invention is mainly directed to the surprisingly simple use of the belted portion of a casing, shorn of its remaining tread, this belted portion including the carcass ply or plies, will be referred to hereinafter as the "belt", and the individual components of the "belt" will be referred to as "belt plies", for the sake of convenience. All references to a "belt" will be to a belted portion of the crown, irrespective of the material of the reinforcing cords, and includes the carcass ply or plies, and the tubeless tire liner, if present, but without the tread, except as otherwise stated. Typically, a steel-belted passenger tire will have a belt with two belt plies, one next to the tread, referred to as the "outer" ply; and one next to the carcass plies, referred to as the "inner" ply, without regard to the location of the belt in a particular configuration of laminate.

Tires, particularly if piled high to store them on open ground, provide good breeding places for encephalitis-bearing mosquitos and an excellent refuge for vermin. Tires are flammable. Fires fed with tires produce a sooty flame and malodorous, if not toxic, vapors. The oily pyrolysate generated contaminates ground waters. Therefore such storage of tires is objectionable.

The formerly widespread practice of burying whole tirres in landfills is also objectionable because the landfill is too unstable for building construction. Buried tires entrain air and tend to float to the surface. To avoid this latter problem, casings may be sliced in half, or chopped into coarse pieces. To do so is costly and of course generates no positive value.

In any consideration of the problems of recycling scrap tires, rather than incinerating them, it will generally be agreed that the best thing to do with a worn out tire is to retread it. In practice, presently about 10 percent of the tires worn out annually are retreaded. All other recycling requires first chopping up the tires into smaller pieces, even if the only intended use is for landfill.

Unfortunately, it is difficult and uneconomical to chop up the belt portion of steel-belted radial tires. This fact has deterred to a considerable extent the development of practical, commercially significant processes to recycle worn out casings into useful articles.

Therefore, much effort has been directed to the aspects of resource conservation, namely reclaiming; and of energy conservation, namely utilization for generating energy.

Resource conservation by chemical processing reclamation, by pyrolysis, whether by microwave energy or thermal pyrolysis, or reclamation by cryogenically or mechanically comminuting the sliced off rubber tread and sidewalls, are all significant, but economically still onerous. Reclaimed rubber has properties inferior to virgin rubber, the end products from pyrolysis do not command a high enough price in the marketplace for pyrolysis to be economically attractive at the present time, and the markets for ground scrap rubber are constricted.

Energy conservation by incineration of casings, sometimes whole, but more often, appropriately chopped up, has come to the forefront as a solution to the disposal problem, provided of course, such burning is done in an environmentally acceptable manner.

A large number of references deal with the foregoing aspects of the problem, among which is a series of articles by T. Ohkita, et al under the title "Effective Utilization of Utilising Scrap Tires" in Parts (I), (II) and (III) dealing respectively with "High temperature tensile tests on vulcanised rubbers"; "Reclamation of rubber from waste passenger tyres under various conditions and high temperatures"; and, "Mixing of asphalt and reclaimed rubber from waste passenger-car tires". Like others in the field, they use chemically reclaimed rubber or mechanically ground rubber particles in blends which are vulcanized. To my knowledge no one has suggested vulcanizing or otherwise bonding the "belt" of one casing with another to take advantage of the unexpected physical properties of such a laminate.

Specialty products provide a limited use of casings. For example, portions of casings of non-radial tires, sometimes with fabric belts (but without steel belts) have been reused by cutting out the beads and sidewalls, and planing away the remaining tread rubber to leave a flat strip of fabric-reinforced vulcanizate. From this fabric-reinforced strip, smaller pieces of chosen size and shape are 'died out' (cut) for use as muffler and tail-pipe hangers on new automobiles, inter alia. A steel-belted portion from the crown of a tire is unsuitable for such processing because of the present technical inability to die cut the belts economically.

Another very limited use of casings is to form crash barriers on highways, breakwaters, and artifical reefs to enhance growth conditions for marine and fish life in the ocean. This latter use is limited to regions where the weather is warm enough to form reefs, even if the high cost of ferrying casings to an appropriate site is disregarded.

The problem of how to cut up steel belted portions of a casing remains. The better solution is to cut up and use those portions of the tires which lend themselves to doing so, yet avoid cutting up steel-belted portions, and at the same time, to find a way to dispose of several hundred million steel-belted radial tires each year.

I have not only found a way to do this, but have serendipitously provided a highly useful article which lends itself to being tailored for a multiplicity of mundane but nevertheless essential purposes.

SUMMARY OF THE INVENTION

I have discovered a valuable recycling technique that does not require the comminution of the belted portion ("belt") of a belted radial tire, but makes valuable use of the properties originally engineered into the belt to discharge its designated function in a tire; and, as an incident of the discovery I have found a simple solution to the problem of disposing of such a "belt" from a casing (worn out steel-belted radial tire). I re-use a belt intact after bonding it to another belt at their common interface, thus forming a laminate in which the physical properties of the belts are greatly altered. By bonding belts together a multiply architecture results in a structure which is sensibly rigid in all three directions.

It is therefore a general object of this invention to provide a structural composite comprising a laminate of plural superimposed belts cut from one or more casings, each belt forming a layer containing angularly oriented layers of reinforcing cords, whether organic or metal.

It is also a general object of this invention to provide a method for forming a structural composite of coextensively superimposed and bonded, preferably steel wire belts comprising, excising a laminar first belt from a first casing and a laminar second belt from a second casing, and bonding the belts together at their common interface, each belt having at least two reinforcing belt plies having equal and opposite cord angles with respect to a mid-longitudinal center plane of each belt wherein there is a cord angle sequence in the range from about $+20°/-20°$ to $+45°/-45°$, each belt being freed of the tire's sidewalls. The result is the formation of an anisotropic laminate of cord-reinforced vulcanizate which has a combination of properties of steel wire and vulcanized rubber; and, different responses to stress in every direction. Most notably, it has a resistance to a bending force, in a plane at right angles to the plane in which the laminate lies, which force is many times greater than that of the belts when superimposed in contact, one with the other, but before they are bonded together. When multiple belts are laminated by bonding together, the resistance of the laminate to the bending force may be as much as 100 times greater than that of the belts when superimposed in contact one with the other, but before they are bonded together.

It is a specific object of this invention to provide a reinforced laminate of vulcanized rubber reinforced with cords, the laminate formed by boding the belts with a bonding means, either an adhesive, but more preferably, a vulcanizable compound, preferably an interlaminar layer of curable rubber compound, thus bonding upper and lower superimposed belts. In one geometry, the outer (or exterior) "tread" surface of the lower belt and the inner (or interior) "liner" surface of the upper belt are bonded one to the other by the vulcanized gum rubber. In another geometry, the liner surface of one belt is bonded to the liner surface of the other, and in still another, the tread surface of one belt is bonded to the tread surface of the other. Each geometry, and permutations thereof which are available when more than two belts are laminated, provides each embodiment of the laminate with different physical properties. Typically the laminate formed contains a major amount (by weight) of rubber and a minor amount of steel wire which imbues the laminate with its exceptional and unexpectedly useful properties. The vulcanized laminate is characterized by a peel strength between belts which is so great that the laminate fails in cohesive, rather than adhesive failure. By cohesive failure is meant that the laminate delaminates at a location, or in a plane other than that in which the interfaces of the belts are vulcanized.

It is another general object of this invention to provide an essentially rigid but deformable, shaped, reinforced laminate of arbitrary shape and size, having either planar or arcuate inner and outer surfaces. If arcuate, the outer surface may be provided by the exterior or "tread" surface of a first curved belt, and the inner surface provided by the interior or "liner" surface of a second curved steel belt, similarly curved, the outer curvature of the second portion being matched to, that is, in conformational correspondence with, the curvature of the inner surface of the first portion, but with end-to-end joints and edge-to-edge joints staggered; or, by other geometries referred to hereinabove. After being matched and securely held in place, one against the other, the first portion is vulcanized to, or otherwise laminarly bonded, to the second belt at their common arcuate interface. An analogous procedure is followed for planar articles, as described in greater detail hereinafter.

It is yet another general object of this invention to provide an energy-absorbing laminate, constructed in a manner analogous to that described hereinabove, except that a relatively thick layer of elastomer, functioning as an interlaminar spacer, preferably greater than the thickness of a single belt, is sandwiched between successive belts of the laminate, to provide greater absorption of energy per unit weight of laminate than a laminate which is formed by bonding the belts with a thin layer of adhesive or vulcanizate less than 1 mm thick.

BRIEF DESCRIPTION OF THE DRAWING

The foregoing and other objects of my invention will appear more fully from the following description, made in connection with the accompanying drawings of preferred embodiments of the invention, in which.

DETAILED DESCRIPTION OF PREFERRED EMBODIMENTS

Figure 1:
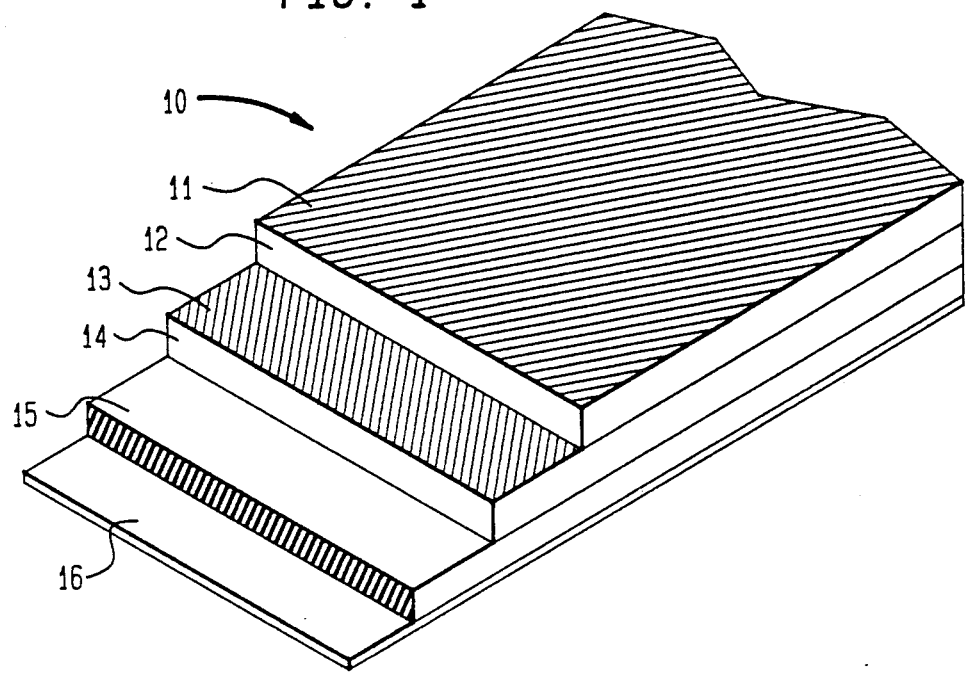
FIG. 1 is an elevated perspective view schematically illustrating a single tread belt which is a laminate of only two belt plies, an outer tread ply, and an inner tread ply, each with embedded steel cords at opposed but equal angles.

A "belt" is typically derived from a casing as follows: the bead and sidewalls are cut away from the casing, and the remaining annular treaded portion is cut open so as to leave a laminar strip. The tread is then sliced from the laminar strip leaving the belt. The resulting exterior and interior surfaces are referred to as the "tread" and "liner" surfaces, respectively. The thickness of the exterior sheath of rubber sheathing the belt cords in the outer belt ply will depend upon how close to the cords the tread is sliced. Typically this exterior sheath is as thin as practical without riding the blade on the cords, generally less than 2 mm thick, and preferably from about 0.1 mm to about 1 mm thick. The cords in the inner ply are likewise sheathed with an interior sheath, namely the carcass ply or plies, along with the inner liner of the tire, or portion thereof, which interior sheath remains with a belt.

Some tires are constructed with one or more belt plies of a stretchable textile fiber, usually nylon, interposed between the steelbelt plies and the tread. Such textile fiber belt(s), referred to as "cap plies" are not required to be removed prior to construction of the laminate. The presence of such cap plies will have a generally inconsequential effect on the overall geometry and therefore the properties of a laminate.

Consideration of the properties of a "belt" indicates it is a composite, anisotropic construction of carcass fabric, reinforcing cords of the belt plies, and rubber reinforced with carbon black. In the fore and aft directions (relative to the rolling direction) a linear belt is stiff, being essentially inextensible and incompressible. It is this property which is chiefly responsible for the excellent tread wear of radial tires. In the lateral direction, a "belt" is also stiff. It is this property which is chiefly responsible for the excellent handling characteristics of a radial tire. A belt is flexible only in the transverse (generally up and down) directions, as is necessary to ensure a low rolling resistance of the tire.

A belt from a passenger car tire, when the tread is sliced away from the belt, is typically from about 0.25" (inch) to about 0.375" thick (0.6 cm to 1 cm), from about 5" to 8" (12 to 20 cm) wide, and from about 6 ft to about 10 ft (2–3 meters) long. Some tires may be constructed with three tread plies, the third annular ply being positioned between the inner and outer plies. The third ply also has a cord construction and includes a plurality of parallel cords which form a 0° angle with respect to the midcircumferential center plane. This third ply may be of steel cords, glass fiber, carbon fiber, or a fiber of a synthetic resin. Such a tire is disclosed in U.S. Pat. No. 4,688,615 (class 152/subclass 531). Belts from truck tires may have three tread plies of tread reinforcing steel cords, and an additional fourth ply of steel cords, therefore are usually not only thicker, but wider and longer. All belts having at least two tread plies with steel cords at opposed angles, when laminated as described herein form an essentially rigid but deformable laminate because a bending moment places the cords in the upper belt in tension, and at the same time, places those in the lower belt in compression.

Since the approach to the problem to be solved was not "How do you dispose of such a belt?", but "How can a belt be reused?", the first task was to study the physical properties of a belt. The most immediately evident property is that a belt is flexible to bending stresses normal to the plane of the belt, flexibility in the rolling direction being essential to permit the tire to roll easily. Such flexibility would appear to have been the logical basis upon which to construct a use for belts. It was therefore antithetical to consider using them in an essentially rigid configuration of any sort.

It is this unique utilization, antithetical though it may be, of the flexible properties of a belt, which provides an energy-absorbing laminate comprising at least two belts each of which first and second belts is covered with an upper layer and lower layer of adhesive, preferably newly vulcanized rubber (so termed to distinguish it from the already vulcanized rubber of the belts which are revulcanized). The first and second belts are in coextensively opposed spaced-apart relationship and spaced apart by at least the adhesive or newly vulcanized rubber which forms a bonding layer bonding said first and second belts to one another in the common contact areas. Depending upon what geometry is used, the extent to which the adhesive layer is "filled" with a filler, for example, ground rubber particles, or whether a core is used between next-adjacent belts, the degree to which the laminate is deformable can be controlled. The resulting laminate is nevertheless essentially rigid, but still having anisotropic properties.

It will be appreciated that adequate bonding may be obtained with pressure sensitive adhesives, such as blends of high and low viscosity polyvinyl ethers; copolymers of acrylate esters with acrylic acid; elastomeric adhesives such as polyurethanes formed by the reaction of diisocyanates with polyalkylene polyether glycols or polyester glycols, or polyalkylene glycols; or non-elastomeric adhesives such as resin systems containing cyanoacrylates; or, epoxies such as the diglycidyl ether of bisphenol-A/meta-phenylene diamine, particularly Epon® HPT 1071 or HPT 1072 available from Shell Chemical; or polyimide, all of which are unvulcanized adhesives.

In the preferred embodiment of the foregoing basic structure, however, the first belt is vulcanized to the second, and in each of the embodiments described hereunder, each belt is vulcanized to the next adjacent belt with a thin layer, from about 0.1 mm to about 5 mm thick, preferably from 0.1 mm to 1 mm thick, of carbon black reinforced gum rubber compound similar to cushion gum used in the retreading industry to bond unvulcanized rubber to the surface of a previously vulcanized tire casing. A greater thickness may be used, but there is no economic advantage for using more than is necessary to effect the desired bond. Vulcanization may be effected in a curing press, either at elevated temperature and pressure as is conventional, or at ambient temperature, if the demands on the physical properties of the cured laminate will allow. Curing at substantially room temperature may be effected with known curatives.

An adequately thin layer of gum rubber may be deposited from an extruder with a slit in the extrusion head adapted to deposit the desired amount of gum rubber, adequate for the purpose at hand, on the surfaces of the belts to be bonded. The tread surface being freshly exposed, needs no further 'prepping' (preparation), but the liner surface is coated with the release agent used to prevent the liner from adhering to the curing bladder when the tire is cured, and this release agent is preferably removed, either by washing with detergent or solvent, more preferably by scuffing the surface with a stiff wire brush. Some tires are interiorly coated with an elastomeric laminar sealant in a thickness from about 3 mm to about 5 mm thick which is preferably doctored off with a blade.

The area on each surface to which the gum rubber is applied is not narrowly critical, but it is preferred to coat the entire area of at least one of the surfaces before they are pressed together and cured, if the best bonding is sought.

Formation of a "Slat"

A laminate of only two belts is an elongate, single-belt-wide laminate termed a "slat". A belt is schematically illustrated in the perspective view shown in FIG. 1, and indicated generally by reference numeral 10. The outer tread ply 11 has steel cords 12 at an angle of $+23°$, and the inner tread ply 13 has steel cords 14 at an angle $-23°$. The carcass ply 15 is typically of polyester fiber or fabric and the inner liner 16 is often a compound of chlorobutyl rubber.

Figure 2:
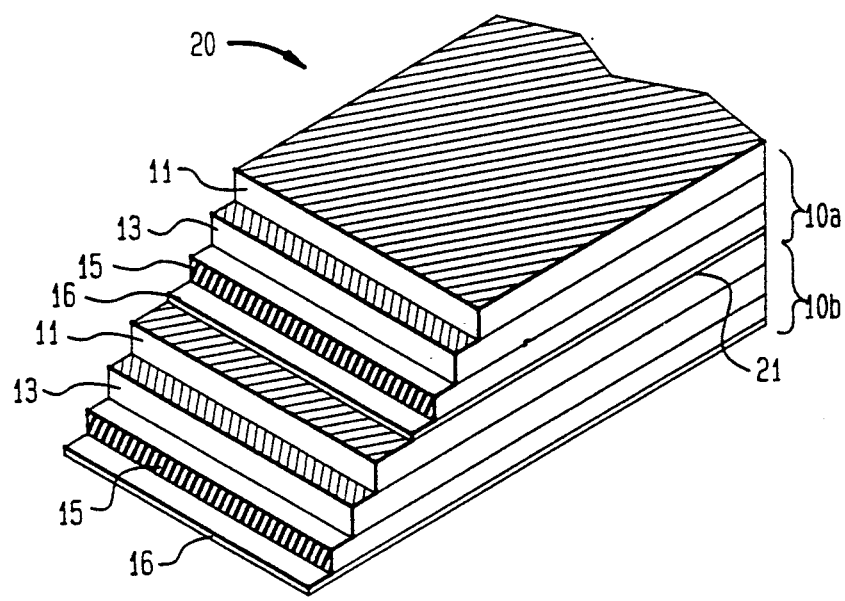
FIG. 2 is an elevated perspective view of a first configuration (I) of a slat in which the outer (tread) surface of the lower belt is bonded to the inner (liner) surface of the upper belt.

As illustrated in end elevational cross section in FIG. 2, a slat referred to generally by reference numeral 20, comprises an upper belt 10a bonded with adhesive or newly vulcanized rubber 21, to lower belt 10b, with the tread surface of the lower belt bonded to the liner surface of the upper belt. In this geometry, referred to as configuration (I), if the cord angle is $+23°$ in the outer belt ply 11 of the lower belt 10b, the cord angle in the inner belt ply 13 of the upper belt 10a is $-23°$, and are opposed; but the cords in the outer belt plies of belts 10a and 10b, and the cords in the inner belt plies of belts 10a and 10b, are respectively in the same parallel spaced-apart configuration.

Figure 3:
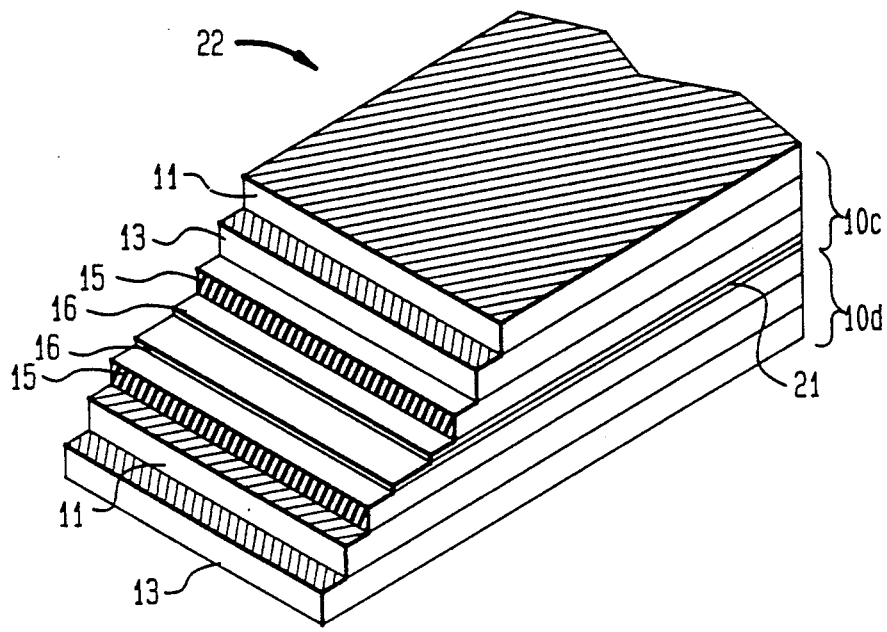
FIG. 3 is an elevated perspective view of a second configuration (II) of a slat in which the liner surface of the lower (inner) belt is bonded to the liner surface of the upper (outer) belt (components are not to scale).

Referring to FIG. 3 there is shown an end elevational cross section of a slat 22 comprising upper belt 10c bonded to lower belt 10d by the vulcanized gum rubber 21, the liner surface of the outer belt 10c being bonded to the liner surface of the inner belt 10d (configuration II). In this geometry, the vulcanized belts are spaced apart by the width of twin liners and carcass plies, and the cords in the respective inner plies are at opposed angles, as are the cords in outer plies of each belt. A successive belt laminated to either exterior surface of the slat (II) would be spaced by the thickness of rubber left covering the cords of the outer plies of the slat, plus the thin layer of vulcanized rubber used, plus the thickness of the liner and carcass plies of the successive belt, if the latter is vulcanized to the slat with its inner (or liner) surface.

Figure 4:
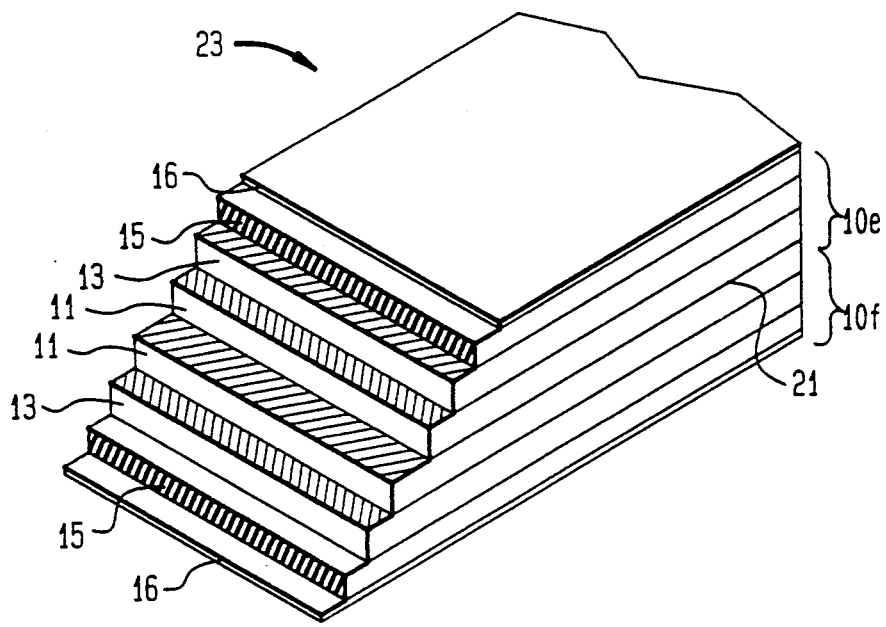
FIG. 4 is an elevated perspective view of a third configuration (III) of a slat in which the tread surface of the upper belt is bonded to the tread surface of the lower belt.

Referring to FIG. 4 there is shown an end elevational cross section of a slat 23 comprising upper belt 10e bonded to lower belt 10f by the vulcanized gum rubber 21, the tread surface of the upper belt 10e being bonded to the tread surface of the inner belt 10f (configuration III). In this geometry, the vulcanized belts are spaced apart by the thickness of the newly vulcanized layer of rubber 21 and what remains of the tread, and again, the cords in the respective outer plies are at opposed angles, as are the cords in inner plies of each belt. A successive belt laminated to either exterior surface of the slat (III) would be spaced by the thickness of carcass plies and inner liner covering the cords of the inner plies on the exterior of the slat, plus the thin layer of vulcanized rubber used, plus the thickness of rubber covering the outer ply, or, alternatively, the thickness of the liner and carcass plies of the successive belt, depending upon whether its tread surface or liner surface is vulcanized to the slat.

Thus it is seen that in all geometries, the slat has next-adjacent plies with oppositely directed steel cords.

Formation of a "Bar"

Figure 5:
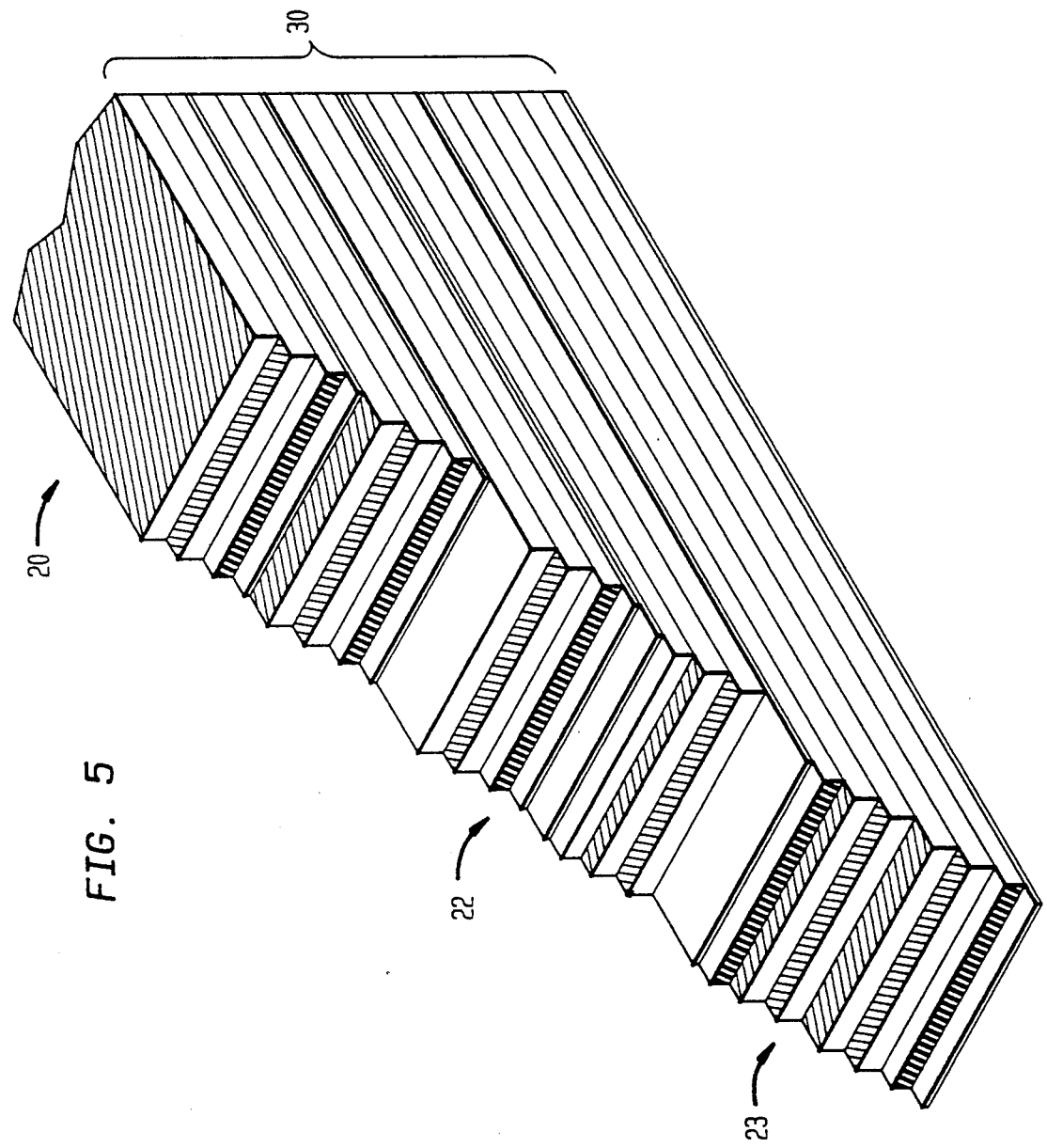
FIG. 5 is an elevated perspective view of a bar made by laminating several belts, or plural slats.

As illustrated in FIG. 5, a bar 30, the length of a single belt, comprises several (at least three) superimposed belts, more typically, plural superimposed slats bonded together at their respective interfaces. The overall properties of a bar may be varied by stacking slats having configuration (I), (II) or (III), or combinations thereof, each slat having the same thickness, in heterogeneous relative order, that is, one or more of (I), followed by one or more of (II), followed by one or more of (III); or by leaving out one or more of any one of (I), (II) or (III) in any sequence; all of which may be done with no particular regard for the order in which the slats are stacked. A bar will typically have a bulk density in the range from about 80–110 lbs/ft$^3$.

Bars may be used as fence posts or as vertical supports for a fence-like barrier on the sides of highways, and between divided highways. Upon impact of a vehicle, the bars will deform but recover its shape. The energy absorbed by the bars dissipates the energy of impact and minimizes damage to the vehicle and occupants.

Formation of a "Beam"

Figure 6:
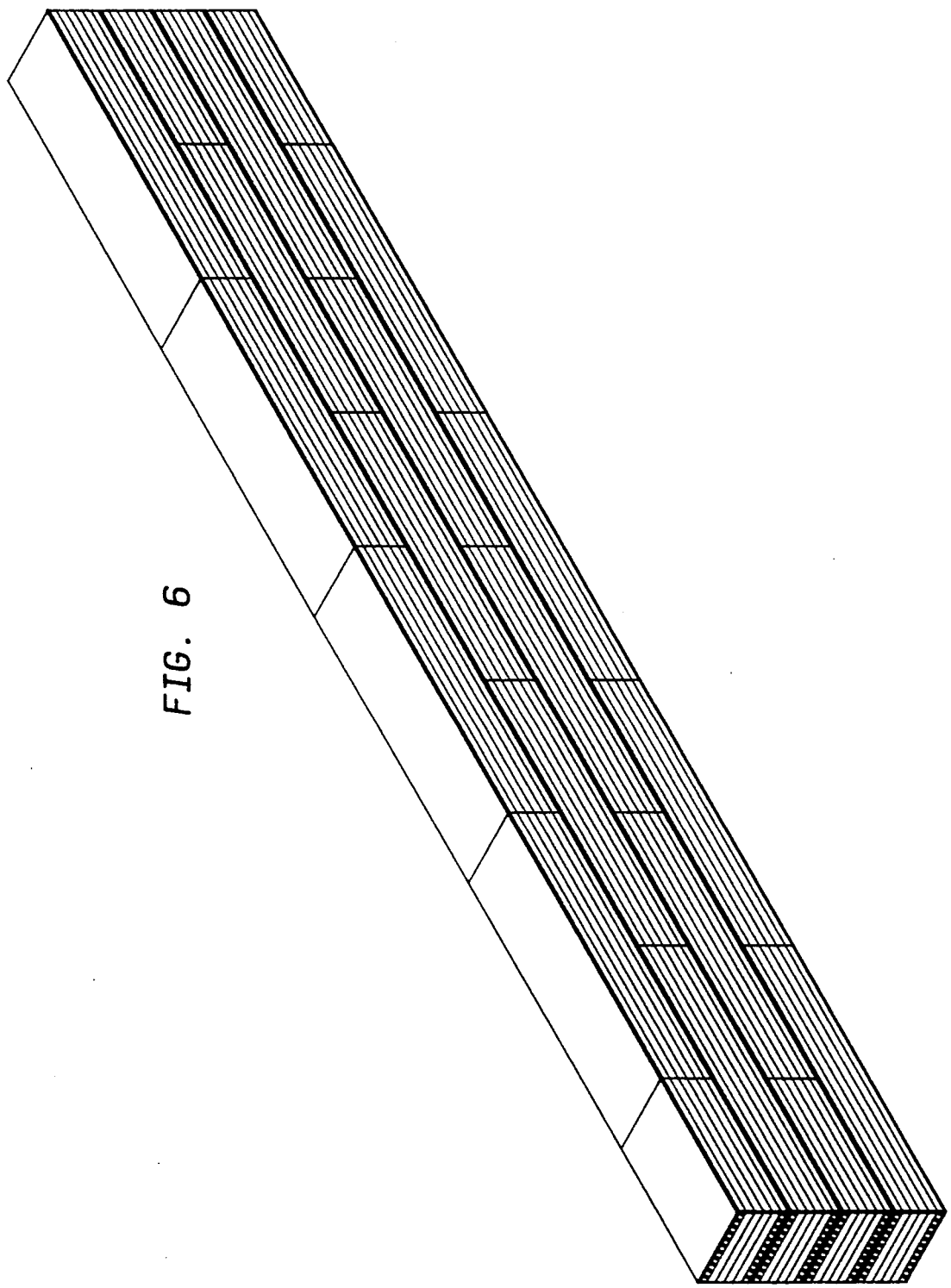
FIG. 6 is an elevated perspective view of a beam made by laminating several belts in end-to-end relationship, and several layers, one on top of the other, with the end joints in each being staggered.

Referring to FIG. 6, a bar of arbitrary length, referred to as a "beam" 40, is formed by placing a sufficient number, say 4, of equal lengths of belts 10g in end to end relationship in a bottom layer, to provide a beam of desired length (say 24 ft). A second layer of belts, with at least their lower surfaces coated with gum rubber, also in end-to-end relationship, is superimposed on the bottom layer, except that the end-abutting joints are staggered. For example, a half a belt is placed at one end, followed by three full lengths, and another half length. A third layer of belts in end-to-end relationship as in the first layer, with at least the lower surfaces of the belts coated with gum rubber, is placed on the second layer, followed by a fourth layer (as in the bottom layer), etc. until enough belts are overlaid to produce a beam of desired thickness. The assembly is then cured.

As an alternative, slats may be stacked to produce a bar, or slats may be used in lieu of belts to produce a beam. A beam, so produced may be used as a vertical joist in a wall, or as a floor joist in lieu of a conventional 1"×12" piece of lumber, or as a sill. Such beams 40 may be secured atop bars 30 to form a fence which has indefinite longevity because belts do not decay and are immune to attack by insects, animals, fungi, etc.

Formation of a "Filled" Slat, Bar or Beam

In the foregoing slat, bar and beam, the belts are directly bonded one to another with newly vulcanized gum rubber. However, prior to curing the gum rubber may be "filled" with a filler which is preferably not virgin rubber but pre-vulcanized ground scrap rubber, the filler being present in an amount insufficient deleteriously to affect the bonding of the belts. Such "filling" of the gum rubber serves as an interlaminar or interlaminal spacer to control the overall thickness of a laminate more accurately than can be controlled by choosing appropriate thicknesses of the requisite number of belts required to form a slat, bar or beam of specified thickness. Since the thickness of a belt is typically about 0.3" (0.75 cm), closer control of the overall thickness can be obtained with a filler. As will now be evident, since the interlaminal spacer is, in turn, bonded to each contiguous belt, the choice of the filler both with regard to its chemical and physical properties, will affect the bond between the belts.

Formation of a "Filled" Slat

Figure 7:
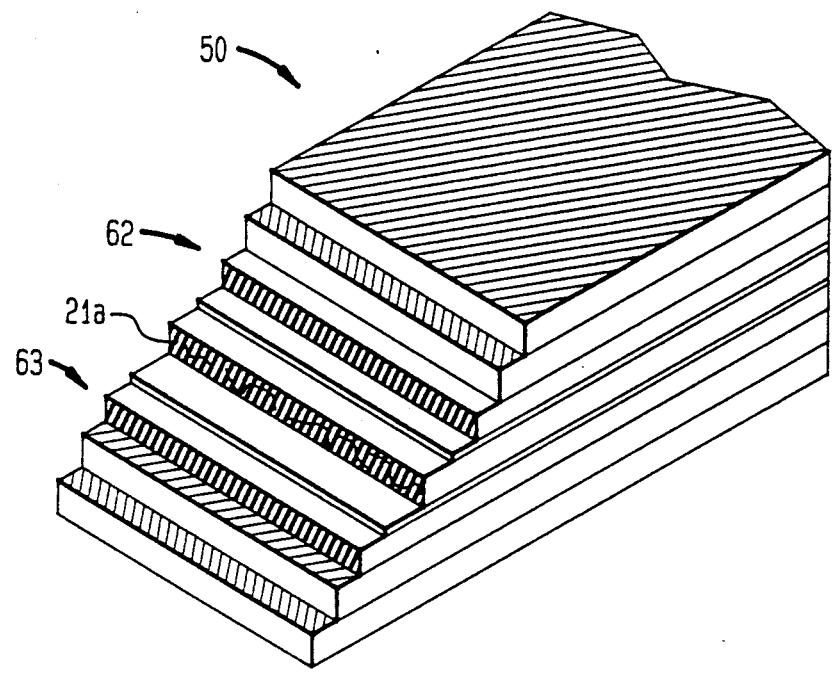
FIG. 7 is an elevated perspective view of a "filled" slat made by using a filler in the adhesive between belts, before they are bonded.

As illustrated in FIG. 7, there is schematically illustrated a "filled" slat 50 comprising a pair of opposed slats 62 and 63 between which is sandwiched a layer of newly vulcanized rubber 21a in which is substantially homogeneously dispersed a profusion of ground rubber particles in the size range from about 200-80 Tyler mesh. Optionally strands of rubber or organic fibers, or both may be used to "fill" the sandwich, neither the amount nor the identity of either being narrowly critical except as dictated by the degree to which each may adversely affect the peel strength of the laminate. In an analogous manner, a "filled" bar or beam may also be fabricated.

Formation of a "Cored" Slat

Figure 8:
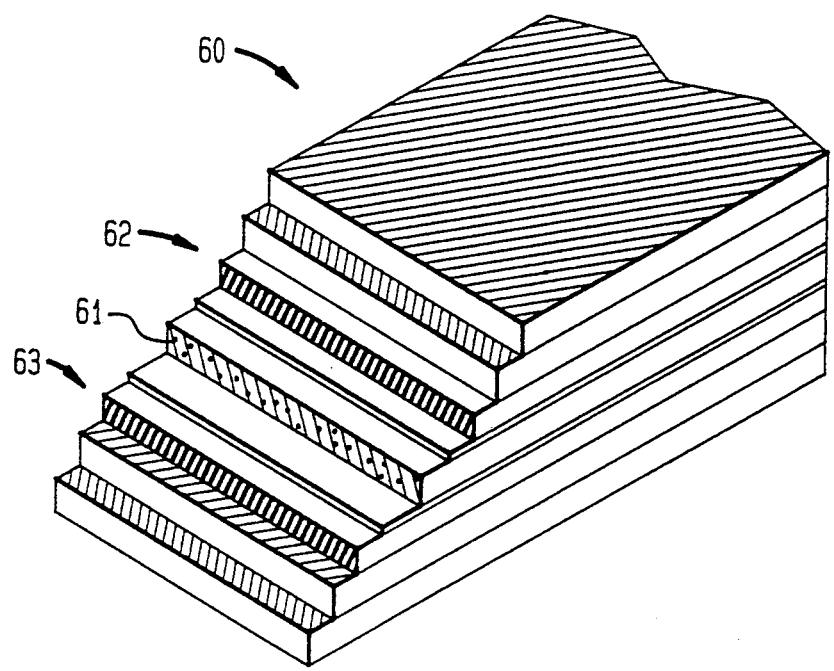
FIG. 8 is an elevated perspective view of a "cored" slat made by sandwiching a core of foam or other laminar spacer between slats bonded to opposite sides of the core.

As illustrated in FIG. 8, there is schematically illustrated a "cored" slat 60 comprising a core of foamed rubber 61 to which is vulcanized a pair of opposed slats 62 and 63 with layers 21b and 21c of newly vulcanized rubber. The core is a parallelepiped of the same length and width as each slat, the thickness of the core and the properties of the foam being chosen to provide the desired degree of deformability to the otherwise essentially rigid filled slat.

The choice of core is not restricted to a foam, whether open or closed cell, or to materials to which the slats may be vulcanized. Any material may be used to which the slats can be adhesively secured. For example, a parallelpiped of low density relatively frangible polystyrene foam having a bulk density of less than 5 lb/ft$^3$ rectangular cross section, the length of each side corresponding to the width of a slat, may be sheathed on all four sides with four slats adhesively secured thereto, and the ends capped with sections of belt, and the edges sealed to form a water-tight and durable float having an indefinitely long life.

In its general configuration, a reinforced laminate in the form of a bar having bottom and top belts, has at least one, and preferably from 2 to about 10 or more intermediate belts coextensively interlaminated therebetween, each belt having an upper and a lower surface, and each upper and lower surface of said intermediate belt is bonded to the lower and upper surfaces, respectively, of a belt in a next-adjacent layer, and when plural intermediate belts are interlaminated, ultimately to the upper surface of the bottom belt and the lower surface of the top belt.

In its general configuration, a reinforced laminate in the form of a beam having a bottom layer of bottom belts and a top layer of top belts in end-to-end abutting relationship in each layer, and plural intermediate belts coextensively laminarly superimposed therebetween in end-to-end abutting relationship in at least one intermediate layer. The end joints in each successive layer are transversely staggered relative to the end joints in a next adjacent layer. The upper and lower surfaces of all belts in the intermediate layer are bonded to the lower and upper surfaces, respectively, of a belt in a next-adjacent layer, and if there are plural intermediate layers, ultimately to the upper surfaces of the bottom belts and the lower surfaces of the top belts.

Formation of a Square Mat

Figure 9:
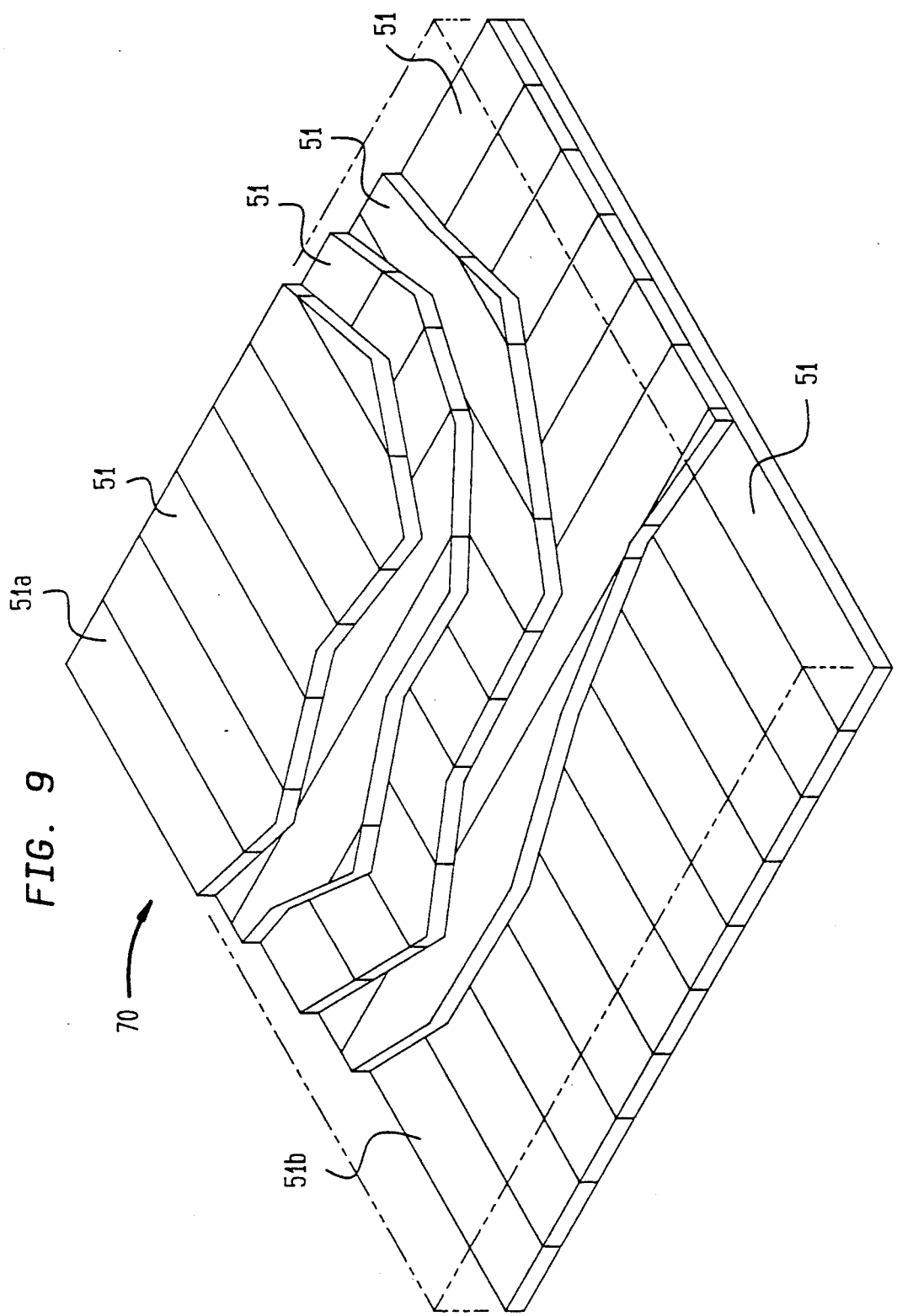
FIG. 9 is an elevated perspective view of a "square" mat formed by vulcanizing plural layers of contiguous belts laid side-by-side in each layer, but with the belts in one layer at right angles to those in a next-adjacent layer.

As illustrated in FIG. 9, a square mat 70, the width and length of which corresponds to the length of each of the belts 51 used to form the mat. The bottom layer is formed by placing the proper multiple (approximately the length of a belt divided by its width), of belts 51 side-by-side, in edge-to-edge abutting relationship, the belts 51a and 51b at opposed edges of the square snugly restraining those between them. The belts are preferably placed, "tread" surface up, and for best bonding, the upper surfaces are coated with gum rubber (not shown). The succeeding second layer is provided by an equal number of belts 51 as in the first layer superimposed thereupon, but oriented at right angles to them. Preferably the "liner" surface of belts in the second layer is in contact with the gum rubber on the tread surface of the bottom layer, and the liner surface is also coated with gum rubber. A third layer is analogously provided, except that the orientation of the belts is the same as in the first layer. A fourth layer is overlaid on the third, except that the orientation of the belts is the same as in the second layer; and so forth, until the mat is built up to have sufficient thickness for the purpose for which it is intended, for example a ballast mat at a railroad crossing. The mat is then cured, preferably in a curing press.

Formation of a Mat of Arbitrary Dimensions

Figure 10:
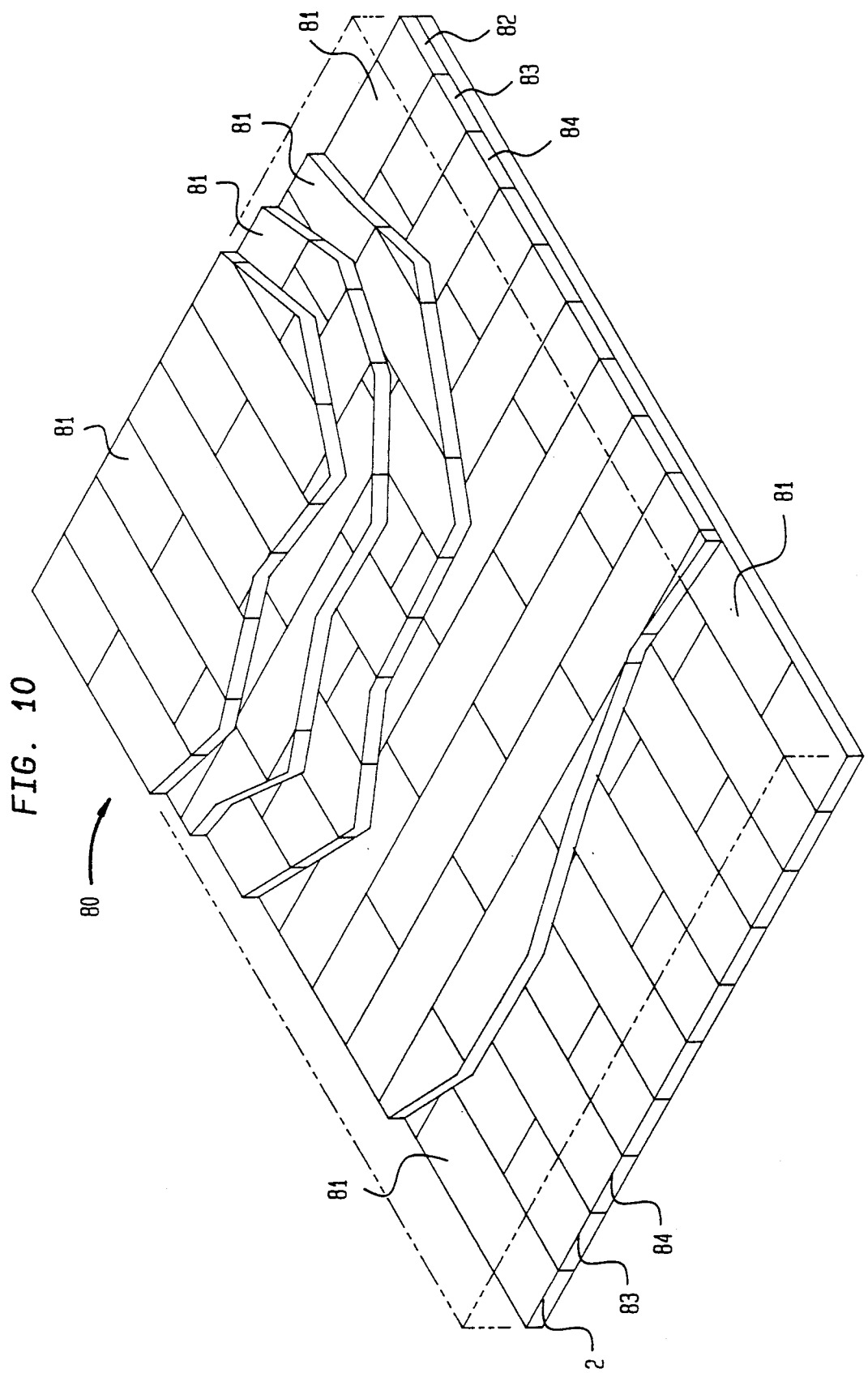
FIG. 10 is an elevated perspective view of a mat of arbitrary dimensions, made with plural belts in end-to-end relationship in each row; plural rows in each layer, with the end joints in each row staggered with respect to the contiguous row; and, the belts in each layer at right angles to those in the next-adjacent layer.

As illustrated in FIG. 10, a mat 80 of arbitrary width and length is formed by placing plural belts 81 (say 4 of equal length) in end-to-end abutting relationship in a first row 82, as if laying the bottom layer of a beam. A second row 83 of belts is laid in edge-to-edge abutting relationship and in the same plane as the first row, except that the end-abutting joints are staggered relative to those of the first row, for example by starting and ending with a half length, with three full lengths between them. A third row 84 is laid next to row 83, in edge-abutting relationship thereto, so that row 83 is snugly held between rows 82 and 84, the interior belts of row 83 having each of their ends and edges abutting an end and an edge, respectively, of another belt. A fourth row is laid in a manner analogous to the second, etc. until enough rows are formed to provide a mat of desired width.

The same procedure is followed for a second layer of belts except that the belts are overlaid at right angles to those in the bottom layer until the bottom layer is fully covered. As in the formation of the square mat, both surfaces of the belts at the interface of the contiguous layers are coated with gum rubber for best bonding. Succeeding layers are provided by maintaining the orientation of belts in each layer transverse to the orientation of belts in a next adjacent layer, until the mat is built up of desired thickness. Again, all joints of belts in next-adjacent layers are staggered to avoid congruence of the joints. In special instances it may be desirable deliberately to provide congruence recognizing its effect on the physical properties of the laminate.

The result in each case is the construction of a bonded mat comprising a vulcanizate, reinforced with plural super-imposed belts each containing plies with preferably steel wire cords in parallel spaced-apart relationship with respect to each other in the same layer. The cords in at least two plies in each belt are oriented at opposed but equal angles and the belts, whatever the alternating configuration in which they are used, are vertically spaced-apart only by a thin layer of newly vulcanized rubber. The belts in each layer of the mat are in edge-to-edge and end-to-end relationship except those at the edges. The orientation of belts in one layer is transverse relative to that in an adjacent layer, the result being a rigid but deformable mat useful to provide a surface on a highway bridge, or a boat dock.

It will now be evident that a mat, whether square or of arbitrary dimensions, may also be constructed from slats, or filled slats, bars or beams, or, cored slats, bars or beams, to provide desired anti-vibration or other properties.

Formation of an Arcuate Slat

Figure 11:
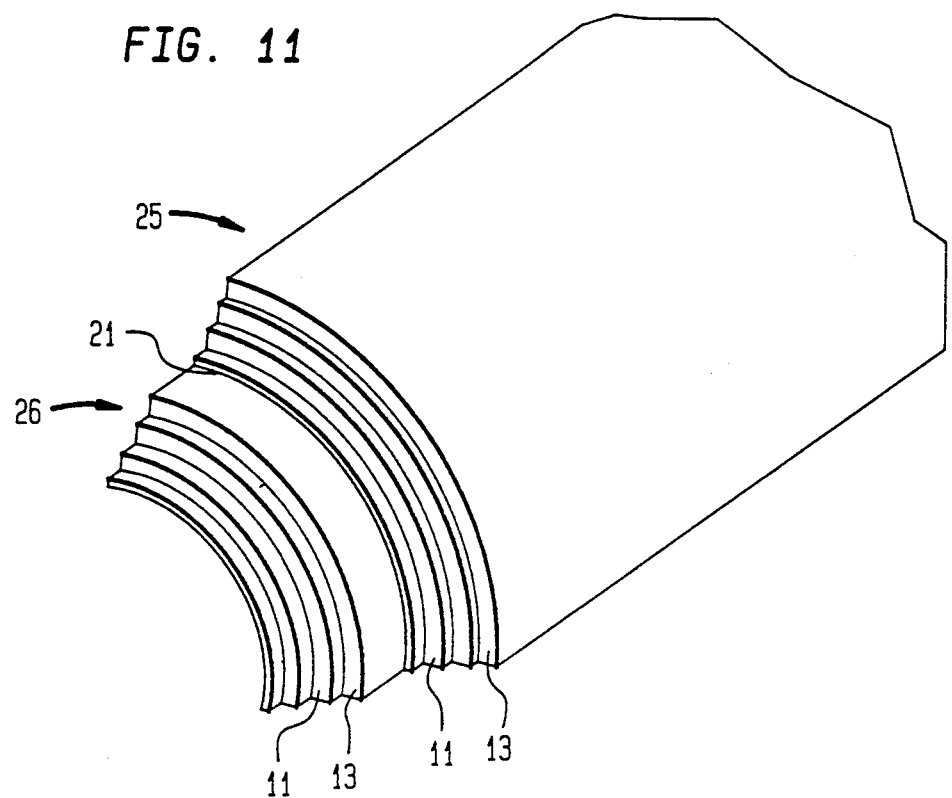
FIG. 11 is an elevated perspective view of an "arcuate" slat.

An arcuate or curved laminate having a curvature of chosen radius, or multiple curves each with a chosen radius which may be the same or different, and formed with only two belts, is an elongate, single-belt-wide laminate termed an "arcuate slat". It is possible to form the laminate with any desired curvature to which a belt can be conformed, because each belt is flexible. As schematically illustrated in FIG. 11, arcuate slat 90 is formed by placing a first single outer belt 25, preferably with its tread surface down, to conform to a molding surface having a radius corresponding to the outside radius $R_o$ of the arcuate slat to be formed. The outer belt 25 is coated with gum rubber 21 on its liner surface, and an inner belt 26 is superimposed on the coated liner surface of outer belt 25. Preferably, the tread surface of the inner belt is adhered to the liner surface of the outer belt. The adhered belts are then tightly pressed together, preferably in a curing mold, and cured. The resulting geometry of the slat is analogous to that of the configuration (I) except for the curvature of the arcuate slat. Other geometries corresponding to configurations (II) and (III) may be produced in an analogous manner.

The method for forming arcuate bars, beams and mats proceeds in a manner analogous to that described hereinabove, except of course, the laminates are formed against an appropriately curved surface. As in the construction of a generally linear beam, or planar mat, congruence of end and/or edge joints is avoided by staggering successive belts to obtain rigidity and strength. The number of belts used to form an arcuate bar, beam or mat will be determined by the properties sought in the end product. The inner radius $R_i$ desired may be accurately provided by using a filler between radially next-adjacent belts.

Arcuate bars may be used as highway dividers to deflect a vehicle veering off the highway and crashing into the divider. A semi-circular beam may be secured against bridge abutments and the like, to effect the same purpose. The deformability of the semi-circular beam will result in less damage than with conventional steel fences or barrels, or scrap tires filled with sand. An alternative use for arcuate bars is for marine bumpers, to cushion the impact of a vessel.

Whatever the configuration of the geometry of a laminate formed as described herein, any one, or more exterior surfaces of the laminate may be coated with a coating to enhance the appearance of the laminate, particularly to cover protruding cords at any surface. Such coating may be elastomeric, typically rubber, which is applied to the surface and cured, or a thermoplastic polymer, but the coating may also be a thermosetting resin. Such coatings which may contain fillers including pigments or reinforcing fibers, when applied to the surface of a mat (say), may provide it with a high finish which can be desirable for, say, a counter top or table top.

In its general configuration a reinforced laminate in the form of a mat, comprises, at least two rows of belts forming a bottom layer of bottom belts, and at least two rows of belts forming a top layer of top belts, all belts in each row being at least in edge-to-edge abutting relationship in each layer. At least one intermediate layer contains plural intermediate belts coextensively laminarly superimposed in contact with and between said top and bottom layers in at least edge-to-edge abutting relationship in said intermediate layer. The edge joints in each successive layer are transversely staggered relative to the edge joints in a next adjacent layer. Each upper and lower surface of each intermediate belt is bonded to the lower and upper surfaces, respectively, of a belt in a next-adjacent layer, and when plural layers of intermediate belts are laminated, ultimately to the upper surfaces of the bottom belts and the lower surfaces of the top belts.

In a particular embodiment of the general configuration, a ballast mat is constructed comprising a major amount by weight of rubber vulcanizate reinforced with plural layers of belts superimposed one upon the other, having steel wire cords in laterally spaced-apart relationship with respect to each other in the same layer; and in vertically spaced-apart relationship to cords in another layer. A first, upper layer of belts is provided by at least two adjacent steel-belted portions of a vulcanized pneumatic tire in longitudinal edge-to-edge relationship in a first edge-abutting line; and a second lower layer of belts is provided by at least two adjacent steel-belted portions of a vulcanized pneumatic tire in longitudinal edge-to-edge relationship in a second edge-abutting line. And the first and second edge-abutting lines are mutually displaced or staggered relative to each other in parallel planes, for maximum strength.

Formation of an Annular Body

Figure 12:
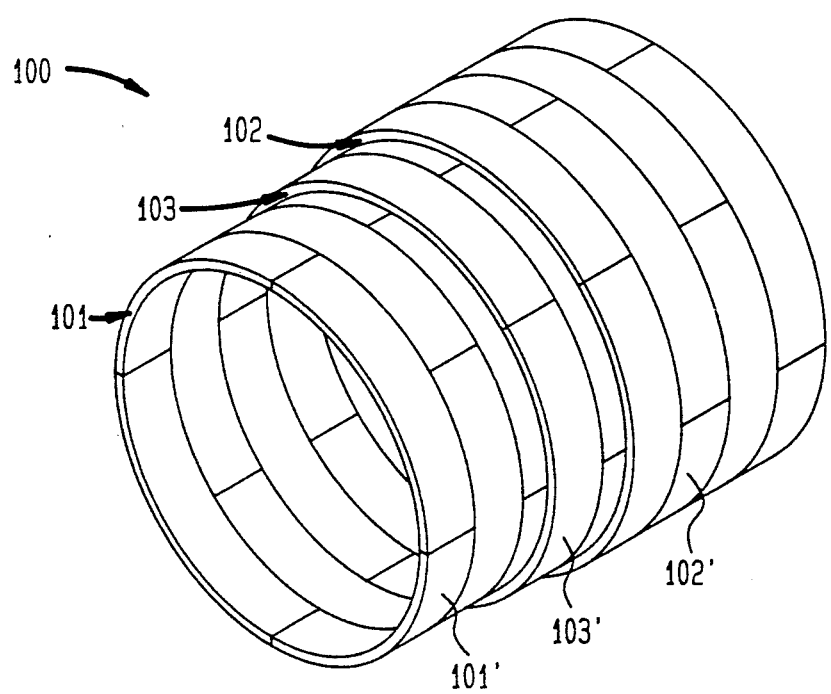
FIG. 12 is an elevated perspective view of a cylindrical annulus formed with a multiplicity of first belts laid side-by-side, as a multiplicity of contiguous hoops, to form the inner structural member of the annulus; and, to form the next-adjacent outer structural member of the annulus, a corresponding number of second belts, each a little longer than a first belt (in the next-adjacent inner layer of the annulus), the second belts staggered relative to the first belts in the longitudinal direction, if each belt has the same width, in a second layer to form the outer structural member of the annulus.

An annular body of arbitrary cross section may be formed in a manner analogous to the formation of a mat. As schematically illustrated in FIG. 12, a cylindrical annulus 100 is formed by conforming a first inner layer 101 of first belts 101' in end-to-end and edge-to-edge abutment, in a geometry resembling a series of contiguous hoops (or annuli), to cover the surface of a cylindrical mandrel (not shown) having an outside radius corresponding to the inner radius of the cylindrical annulus to be formed. This inner layer 101 of first belts 101' is removably, temporarily adhered to the mandrel. As before, the outer surfaces of the first belts in the inner layer are coated with gum, and an intermediate layer 103 is overlaid on the first inner layer 101, with lines formed by the abutting edges and ends of the belts in the intermediate layer 103 transversely displaced (the hoops are staggered) relative to those of the inner first layer 101 until it is covered. Since the circumference of the intermediate layer 103 is greater than that of the first inner layer 101, it will be evident that the combined circumferential length of the intermediate belts 103' in each hoop of the intermediate layer 103 must be greater than that of the combined length of the first belts in each inner hoop of the inner layer. This requirement may be met by having the same number of lengths of belts in each inner and outer hoop, except that the belts in the outer hoops are longer; or, if the first and second belts are the same length, having an additional belt, or required portion thereof, in the outer hoop.

A third outer layer 102 of outer belts 102' is then overlaid on the intermediate layer 103, with the edge joints and end joints staggered, as before, until the surface of the intermediate layer is fully covered. The assembly is then cured, whereupon the temporary adhesive, for example a wax, is melted and the annular laminate may be slid off the mandrel.

Though the cylinder 100 is illustrated as being built with three layers, for superior strength, the intermediate layer may be omitted if less strength and greater deformability is desired, particularly if the cylinder is to absorb impact. It will be appreciated that, though a laminate of this invention is sensibly rigid, it is nevertheless deformable to some extent because of the amount of rubber in the laminate. By "deformable" I particularly refer to the desirable manner in which the laminate absorbs impact, or exhibits stiffness in a comparison with equivalent thickness of wood, or metal such as aluminum and steel or concrete, used to build highway structures to improve their safety.

As an alternative, each belt in the outer layer may be individually, sequentially cured upon the inner layer by an arcuate, heated, forming mold.

As with a slat, bar, beam, or mat, whatever the geometry to which the belts may be conformed to produce a desired configuration, an annular body may also be constructed with a bonding layer which may be filled with a filler or reinforcing agent. In all cases it will be evident that obtaining a chemical bond between the bonding layer and the surface of a belt will be preferably to using an adhesive where there is no chemical bond. As before, most preferred is a vulcanizable gum rubber reinforced with from about 0 to 30% by weight of carbon black, based on the weight of gum rubber and carbon black.

Whether the annular body is cylindrical, elliptical, or any other cross section, it is also an energy absorbing laminate in which the belts, or only a single belt or belt portion, is formed to provide an individual annulus. Plural first annuli are contiguously disposed circumferentially along a common longitudinal axis to form a first lower layer with plural lower (first) edge-to-edge joints. The ends of each annulus are in abutment in a lower (first) end-to-end joint; and, plural second annuli are contiguously disposed circumferentially along the common longitudinal axis, forming an upper (second) layer of belt portions overlaid upon said first layer. The edges and ends of the belt portions in each annulus in the upper layer are also in abutment forming edge-to-edge and end-to-end joints, and for maximum strength, each is transversely displaced relative to the lower edge-to-edge and end-to-end joints (in the lower layer). Preferably, the bonding layer is curable gum rubber in a thickness in the range from about 0.1 mm to about 5 mm.

Figure 13:
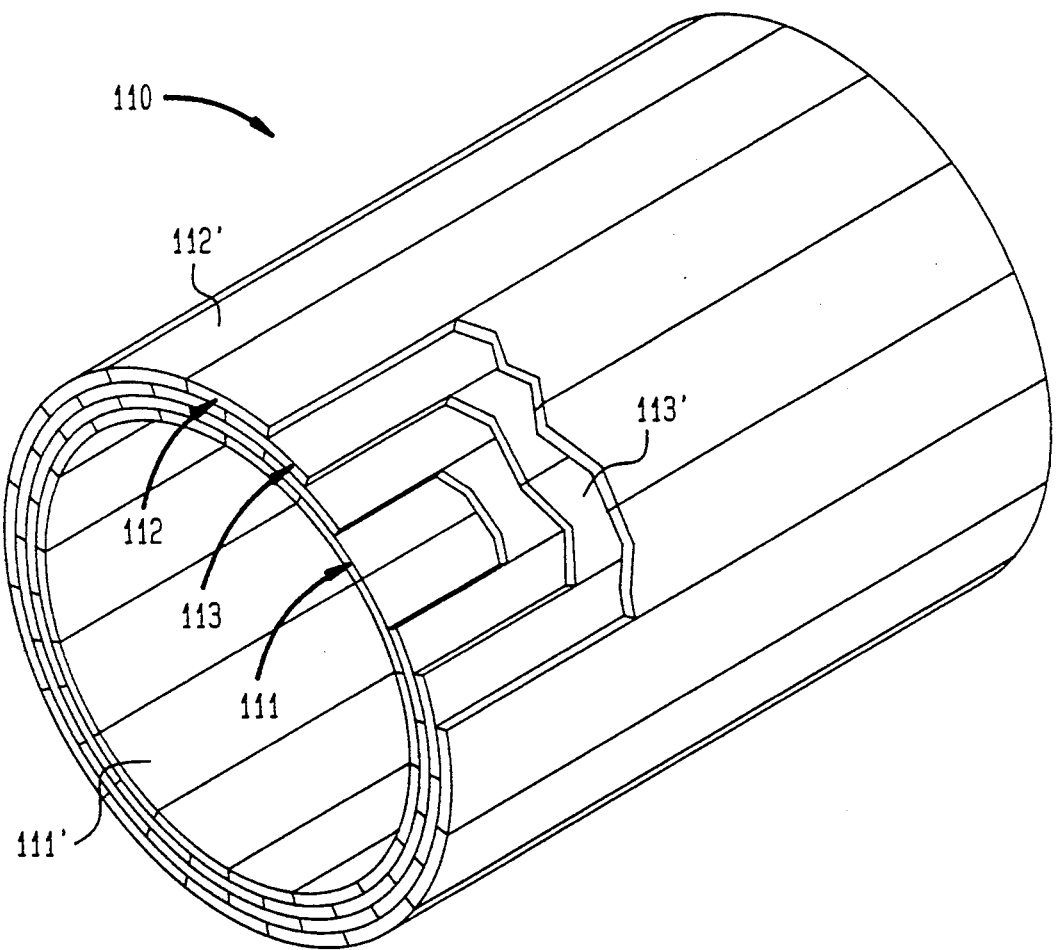
FIG. 13 is an elevated perspective view of a cylindrical annulus constructed in a barrel-like configuration, formed with a multiplicity of first belts laid side-by-side, in a manner analogous to the staves of a barrel, to form the inner structural member of the annulus; and, to form the next-adjacent outer layer of the annulus, a corresponding number of second belts, each a little wider than a first belt (if all belts are the same width), the second belts, staggered relative to the first belts in the circumferential direction, in a second layer, to form the outer structural member of the annulus.

An alternative configuration for an annular body of arbitrary cross section is to assemble the belts end-to-end in the longitudinal axial direction, and edge-to-edge circumferentially, in the manner of barrel staves, as illustrated in FIG. 13. An annular body, a cylindrical annulus 110 comprises first (inner) 111, intermediate 113, and outer 112 layers respectively; and, additional layers, if desired to increase the burst strength and rigidity of the structure formed; or only an inner and outer layer if such a laminate is desired. The cylindirical annulus is formed on a forming body (cylindrical mandrel), the length of the cylinder (in this specific illustration) being the length of a belt to be used. Plural first belts 111' are temporarily affixed to the surface of the mandrel. An intermediate layer 113 of belts 113' is then superimposed on the first inner layer 111, but each belt 113' is circumferentially displaced so that the edge joints of the belts 113' are staggered (there are no end joints because the ends form the peripheries of the open ends of the cylinder) relative to the edge joints of the belts 111'.

An outer layer 112 is then formed with outer belts 112' covering the intermediate layer 113, the edge joints again being staggered relative to the edge joints in the intermediate layer. Additional layers may be interlaminated, maintaining the circumferential displacement of edge joints in next-adjacent layers. The assembly is then cured, whereupon the temporary adhesive is melted and the cylinder is slid off the mandrel.

The foregoing procedure may also be used to construct an annulus with an elliptical cross section, or one with a sinusoidal, or even more complex arcuate periphery. Such an annulus is also an energy absorbing laminate wherein the belts are vulcanized to form an annular body of arbitrary cross section and size. Such a body comprises, plural first belt portions contiguously disposed longitudinally, parallel to a common longitudinal axis to form a first lower layer having plural lower (or first) edge-to-edge joints; and, plural second belt portions contiguously disposed longitudinally, parallel to the common longitudinal axis, forming a second upper layer of belt portions overlaid upon said first layer. As before, for maximum strength, the edges of the belt portions in the upper layer are in abutment in upper (or second) edge-to-edge joints transversely displaced relative to the lower edge-to-edge joints. Also as before, the preferred bonding layer is curable gum rubber in a thickness in the range from about 0.1 mm to about 5 mm.

Whichever form of an energy absorbing laminate is desired, the method for forming it comprises, placing at least two de-treaded belted portions or "belts" of a vulcanized pneumatic radial tire, one upon the other; introducing an adhesive bonding means at the common interface of said belted portions; and, bonding the belts together at their common interface.

It will now be evident that, any embodiment of the laminate, formed as described hereinabove, may be either "filled" or "cored", depending upon the application for which it is adapted. In addition to controlling the deformability of a laminate by the number of layers of belts used, the choice of filler and core permits an additional parameter for such control. With appropriate combinations of slats, bars, beams, and mats, optionally filled or cored with insulating material such as a synthetic resinous open or closed cell foam, one can construct a shelter comprising complex roof shapes supported by beams in turn supported by wall joists, and floors supported by floor joists, all formed from scrap belts from radial tires. Mats may be constructed which may be used in lieu of sheets of conventional plywood, both interiorly or exteriorly without regard to being significantly damaged due to outdoor exposure to the elements. Arches and other components of arbitrary and complex shape, such as a crenelated or sinusoidal overhang projecting from a wall, can be pre-formed by using the appropriate combinations of belts of appropriate length and width, and portions thereof, and curing the shaped article in stages. All structural components are formed by simply cutting, fitting and adhesively bonding or vulcanizing the desired number of belts together. The components may then be assembled at the site, using the most primitive tools.

It will be recognized that the term "belt" has been used herein synonymously with a "belt portion" since, typically whole belts are used to construct a laminate, except for the dictates of staggering rows or layers, when a portion of a belt is required. It will also be appreciated, that producing a small laminate may not require a whole belt.

Having thus provided a general discussion of the best mode of the basic invention, and numerous specific illustrations of various embodiments of it, many other applications of the invention will be evident to one skilled in the art; therefore it is to be understood that no undue restrictions are to be imposed by reason thereof, except as provided by the following claims.

I claim:

1. A reinforced laminate of arbitrary shape and size comprising at least two belted portions ("belts") of a vulcanized rubber pneumatic radial tire, each belt being detreaded and freed of the tire's beads and sidewalls, said belts being bonded together at their common interface with a bonding means, each belt having at least two reinforcing belt plies having parallel spaced-apart reinforcing cords at equal and opposite cord angles with respect to a mid-longitudinal center plane of each belt ply wherein there is a cord angle sequence in the range from about $+20°/-20°$ to $+45°/-45°$, whereby an essentially rigid, anistropic laminate of cordreinforced vulcanizate is formed.

2. The reinforced laminate of claim 1 characterized by having different properties when axially compressed bent or torqued in each of three axes 90° from each other, and also when stretched or sheared in each of three axes 90° from each other.

3. The reinforced laminate of claim 2 comprising upper and lower belts wherein each belt has an outer or exterior "tread" surface, and an inner or interior "liner" surface, and the configuration of the laminate is chosen from a geometry in which
   (i) the liner surface of the upper belt is bonded to the tread surface of the lower belt, congruently superimposed thereupon; or,
   (ii) the liner surface of the upper belt is bonded to the liner surface of the lower belt, congruently superimposed thereupon; or,
   (iii) the tread surface of the upper belt is bonded to the tread surface of the lower belt, congruently superimposed thereupon.

4. The reinforced laminate of claim 3 wherein said bonding means is a curable elastomer which upon being cured is chemically bonded to said vulcanized rubber in each belt.

5. The reinforced laminate of claim 4 wherein said curable elastomer is a curable gum rubber which forms an elastomeric layer and maintains said belts in spaced-apart relationship.

6. The reinforced laminate of claim 2 wherein a first belt is adhesively bonded to a second belt without forming a chemical bond between said bonding means and said vulcanizate of each belt.

7. The reinforced laminate of claim 2 wherein said cords are made from a material selected from the group consisting of steel, aramid and glass.

8. The reinforced laminate of claim 7 wherein said cords are steel wire cords.

9. The reinforced laminate of claim 3 forming a slat constructed by bonding only two belts.

10. The reinforced laminate of claim 3 forming a bar, including bottom and top belts, and at least one intermediate belt coextensively interlaminated therebetween, each belt having an upper and a lower surface, and each upper and lower surface of said intermediate belt is bonded to the lower and upper surfaces, respectively, of a next-adjacent belt, and when plural intermediate belts are interlaminated, ultimately to the upper surface of the bottom belt and the lower surface of the top belt.

11. The bar of claim 10 wherein said cords are steel wire cords.

12. The reinforced laminate of claim 2 forming a beam, including a bottom layer of bottom belts and a top layer of top belts in end-to-end abutting relationship in each layer, and plural intermediate belts coextensively laminarly superimposed therebetween in end-to-end abutting relationship in at least one intermediate layer; end joints in each successive layer being transversely staggered relative to the end joints in a next adjacent layer, wherein each belt has an upper and a lower surface, and each upper and lower surface of said intermediate belts is bonded to the lower and upper surfaces, respectively, of a belt in a next-adjacent layer, and ultimately to the upper surfaces of the bottom belts and the lower surfaces of the top belts.

13. The beam of claim 12 wherein said cords are steel wire cords.

14. The reinforced laminate of claim 3 forming a mat, comprising,
- at least two rows of belts forming a bottom layer of bottom belts, and at least two rows of belts forming a top layer of top belts, all belts in each row being at least in edge-to-edge abutting relationship in each layer;
- at least one intermediate layer having plural intermediate belts coextensively laminarly superimposed in contact with and between said top and bottom layers in at least edge-to-edge abutting relationship in said intermediate layer;
- said edge joints in each successive layer being transversely staggered relative to the edge joints in a next adjacent layer; wherein each belt has an upper and a lower surface, and each upper and lower surface of said intermediate belts is bonded to the lower and upper surfaces, respectively, of a belt in a next-adjacent layer, and when plural layers of intermediate belts are laminated, ultimately to the upper surfaces of the bottom belts and the lower surfaces of the top belts.

15. The mat of claim 14 wherein said cords are steel wire cords.

16. The mat of claim 15 wherein rubber is present in a major proportion by weight in said a mat.

17. The mat of claim 15 wherein said mat is of arbitrary shape and size, having arcuate inner and outer surfaces, the curvature of the outer surface of a belt in an intermediate layer conforming to the curvature of the inner surface of a belt in the next-adjacent radially outer layer.

18. The reinforced laminate of claim 5 wherein said curable elastomer has a thickness in the range from about 0.1 mm to about 5 mm thick.

19. A ballast mat comprising rubber vulcanizate reinforced with plural layers of superimposed steel wire cords in spaced-apart relationship with respect to each other in the same layer, and in spaced-apart relationship to cords in another layer, a first, upper layer of belts being provided by at least two adjacent steel-belted portions of a vulcanized pneumatic tire in longitudinal edge-to-edge relationship in a first edge-abutting line, and a second lower layer of belts being provided by at least two adjacent steel-belted portions of a vulcanized pneumatic tire in longitudinal edge-to-edge relationship in a second edge-abutting line, wherein said first and second edge-abutting lines are mutually displaced relative to each other in parallel planes.

20. An energy-absorbing laminate comprising at least two detreaded belted portions or "belts" of a vulcanized pneumatic radial tire, coextensively laminarly bonded together at their common interface, each belt having at least two reinforcing belt plies having parallel spaced-apart cords at equal and opposite cord angles with respect to a mid-longitudinal center plane of each belt ply wherein there is a cord angle sequence in the range from about $+20°/-20°$ to $+45°/-45°$, whereby an energy-absorbing laminate of reinforced vulcanizate having anisotropic properties, is formed.

21. The energy-absorbing laminate of claim 20 wherein said belts have sufficient adhesive at their common interface to bond said belts together with a bond characterized by failure of said laminate in cohesive failure.

22. The energy-absorbing laminate of claim 20 wherein said belts are in opposed spaced-apart relationship and spaced apart by at least a bonding layer which bonds said first and second belts to one another in the common contact areas.

23. The energy-absorbing laminate of claim 22 wherein said bonding layer is curable gum rubber in a thickness in the range from about 0.1 mm to about 5 mm.

24. The energy-absorbing laminate of claim 21 wherein said said adhesive includes a filler present in an amount insufficient to deleteriously affect said bond.

25. The energy absorbing laminate of claim 23 wherein said first belt is bonded to said second belt with a layer of carbon reinforced vulcanized gum rubber.

26. The energy absorbing laminate of claim 22 wherein said first belt is bonded to said second belt with a layer of unvulcanized adhesive.

27. The energy absorbing laminate of claim 21 wherein said belts are vulcanized to form a first slat which in turn is vulcanized to a second slat, similarly formed, and spaced apart therefrom by a layer of cured rubber containing from 0 to about 30% by weight of a filler.

28. The energy absorbing laminate of claim 22 wherein said first belt is bonded to an interlaminar spacer which in turn is bonded to said second belt whereby said spacer forms a core in said laminate, the dimensions and physical properties of the core being chosen to modify the physical properties of the spaced apart laminated belts, compared to the properties of a laminate formed with the same belts but without said core.

29. The energy absorbing laminate of claim 21 wherein said belts are vulcanized to form an annular body of arbitrary cross section and size, said annular body comprising, plural first annuli contiguously disposed circumferentially along a common longitudinal axis to form a first lower layer having plural first edge-to-edge joints, each annulus comprising at least one belt portion the ends of which are in abutment in a first end-to-end joint; and, plural second annuli contiguously disposed circumferentially along the common longitudinal axis, forming a second upper layer of belt portions overlaid upon said first layer, the edges and ends of said belt portions in each annulus in said second layer being in abutment in second edge-to-edge and end-to-end joints respectively, each transversely displaced relative to the first edge-to-edge and end-to-end joints; and, said bonding layer is curable gum rubber in a thickness in the range from about 0.1 mm to about 5 mm.

30. The energy absorbing laminate of claim 21 wherein said belts are vulcanized to form an annular body of arbitrary cross section and size, said annular body comprising, plural first belt portions contiguously disposed longitudinally, parallel to a common longitudinal axis to form a first lower layer having plural first edge-to-edge joints; and, plural second belt portions contiguously disposed longitudinally, parallel to the common longitudinal axis, forming a second upper layer of belt portions overlaid upon said first layer, the edges of said belt portions in said second layer being in abutment in second edge-to-edge joints transversely displaced relative to the first edge-to-edge joints; and, said bonding layer is curable gum rubber in a thickness in the range from about 0.1 mm to about 5 mm.

31. A method for forming an energy-absorbing laminate comprising, removing the sidewalls and tread from a vulcanized radial pneumatic tire having cord-reinforced belt plies, so as to leave a belt or belted portion having a de-treaded outer or "tread" surface on what remains of the tread, and an inner or "liner" surface on the carcass plies and liner, placing at least two de-treaded belts or belted portions one upon the other;

introducing an adhesive bonding means at the common interface of said belted portions; and, bonding the belts together at their common interface, each belt having at least two reinforcing belt plies having parallel spaced-apart cords at equal and opposite cord angles with respect to a mid-longitudinal center plane of each belt ply wherein there is a cord angle sequence in the range from about $+20°/-20°$ to $+45°/-45°$, whereby an energy-absorbing laminate of reinforced vulcanizate having anisotropic properties, is formed.

32. The method of claim 31 wherein said adhesive bonding means is vulcanizable rubber; and, bonding said belts together is effected by curing said laminate.

33. The method of claim 32 including cleaning the liner surface of a belt prior to applying the adhesive bonding means.

34. The method of claim 33 wherein the adhesive bonding means is a vulcanizable gum rubber.

* * * * *